Patented May 14, 1929.

1,712,646

UNITED STATES PATENT OFFICE.

OTTO BRAUNSDORF, AND EDUARD HOLZAPFEL, OF HOCHST-ON-THE-MAIN, AND PAUL NAWIASKY, OF LUDWIGSHAFEN-ON-THE-RHINE, GERMANY, ASSIGNORS TO GRASSELLI DYESTUFF CORPORATION, OF NEW YORK, N. Y., A CORPORATION OF DELAWARE.

DERIVATIVES OF THE BENZANTHRONE SERIES AND PROCESS OF MAKING SAME.

No Drawing. Application filed August 3, 1925, Serial No. 47,966, and in Germany August 15, 1924.

The present invention relates to new sulfur-containing derivatives of the benzanthrone series and a process of making the same.

We have found that by causing a sulfur halide, especially $SHlg_2$, $S_2Hlg_2$ (Hlg stands for halogen), or a mixture of these bodies to act upon a benzanthrone, new sulfur-containing derivatives of the benzanthrone series are obtainable in a good yield. Preferably, the reaction is carried out in the presence of a suitable solvent and a substance capable of promoting the reaction. It probably proceeds in such a manner that, besides benzanthronyl-sulfide, intermediate products are formed which can be easily converted into benzanthronyl-mercaptans and benzanthonyl-sulfides, respectively, by means of a caustic alkali or an alkali metal sulfide. From these products there may then be easily prepared in the usual manner corresponding derivatives, for instance benzanthronyl-disulfide, benzanthronyl-thio-ethers or benzanthronyl-thioglycollic acids. The new bodies thus obtainable are valuable intermediate products for the manufacture of dyestuffs.

The following examples illustrate our invention, the parts being by weight:

(1) One part of benzanthrone is treated in 10 times its weight of anhydrous chlorobenzene, to which 0,01 parts of iodine have been added, with 1–2 parts of sulfur chloride at temperatures between 90 and 140° C. until the evolution of hydrochloric acid has ceased. The object of the iodine is to act as a catalyst. After the solvents have been expelled, the portions capable of being transformed into mercaptan are completely extracted while hot from the yellowish-brown residue by means of a solution of sodium sulfide. There remains benzanthronyl-sulfide,

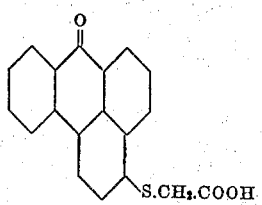

which crystallizes from nitro-benzene in dark yellow laminæ melting at 347° C. Its solution in concentrated sulfuric acid shows a greenish-blue color. The bluish-violet sodium mercaptide after being salted out from the alkali metal sulfide solution yields, when treated with an acid, the benzanthronyl mercaptan of the formula

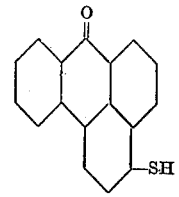

which is of a pure yellow color. It dissolves in concentrated sulfuric acid to a reddish-orange solution. When the benzanthronyl-mercaptan is treated with oxidizing agents, benzanthronyl-disulfide is obtained as a yellow powder melting at about 260° C. and dissolving in concentrated sulfuric acid with a red color and, when in a thin layer, with a violet-blue color. In the preparation of the mercaptan there may be used with the same good result a stronger caustic alkali solution to which there may advantageously be added in the usual manner some alcohol or a reducing agent instead of alkali metal sulfide.

By subjecting the alkali metal mercaptide solution to reaction with dimethylsulfate at ordinary temperature, the benzanthronyl-methylthio-ether is obtained being an orange-colored powder which, when crystallized from alcohol, melts at 151–154° C. and the color of which, when dissolved in sulfuric acid, is pure blue or bluish-green when in a thin layer. If the sodium salt of the mercaptan is heated in an aqueous solution with an excess of neutralized chloroacetic acid, the color of the solution turns orange-red and on acidification, the reddish-yellow benzanthronylthioglycollic acid is precipitated. It has the probable formula:

can be crystallized from glacial acetic acid, melts at about 220° C. and dissolves in concentrated sulfuric acid with a reddish-violet color. The Bz-1-benzanthronyl-4-nitrophenylsulfide of the formula:

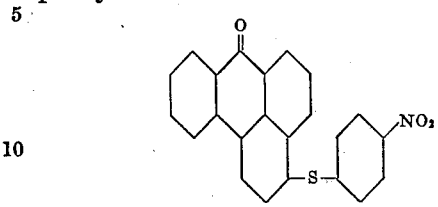

may be obtained, for instance, by subjecting equimolecular quantities of Bz-1-benzanthronyl-mercaptan to reaction with p-nitrochlorobenzene in presence of an alcoholic caustic alkali, in which case there may also be added an organic diluent, such for instance as chlorobenzene. It crystallizes from nitrobenzene as a brownish-yellow crystalline powder, which melts at about 300° C. and dissolves in sulfuric acid to a violet solution with a blue hue.

A specially advantageous method of producing aryl-thio-ethers of benzanthrone consists in condensing halogenated benzanthrone with aryl-mercaptans or salts thereof.

(2) 264 parts of Bz-1-chloro-benzanthrone are boiled in a reflux cooler provided with a stirrer with 136 parts of para-thio-cresol, 3200 parts of alcohol of 96 per cent and 70 parts of pulverized caustic potash for 12 hours. Bz-1-para-thio-cresyl-benzanthrone is produced which, when purified by dissolving in liquefied phenol and precipitating by adding the same volume of methanol, appears as yellow needles, dissolving in sulfuric acid with a greenish-blue coloration and melting at 218–220° C. With 2-chlorobenzanthrone the 2-para-thio-cresol benzanthrone can be produced in a similar way, dissolving in concentrated sulfuric acid with a bluish-red color.

Bz-1-Bz-1'-benzanthronyl-sulfide may also be prepared by starting from Bz-1-benzanthronyl-mercaptan and subjecting the latter to reaction for instance with bromobenzanthrone (obtainable according to German Patent No. 193,959, Example 4).

The benzanthronyl-mercaptans may also be prepared by treating the halogenbenzanthrones with alkali metal sulfide or with alkali metal polysulfide. The reaction of the bromobenzanthrone with sodium disulfide takes a particularly easy and rapid course and yields benzanthronyl-sulfide in a good yield, mercaptan being produced only in small quantities.

(3) 10 parts of bromobenzanthrone (prepared according to German Patent No. 193,959, Example 4) are boiled for several hours on the reflux apparatus with a solution of 100 parts of crystallized sodium sulfide in 50 parts of water and 100 parts of alcohol. From the resulting violet solution of the sodium mercaptan the Bz-1-benzanthronyl-mercaptan is isolated in the usual manner. It is a yellow powder which dissolves in concentrated sulfuric acid to an orange solution.

(4) 10 parts of bromobenzanthrone are treated for three hours at a temperature of about 120–150° C. with a disulfide solution prepared with 12 parts of sulfur and 50 parts of crystallized sodium sulfide. After the resulting product has been treated by boiling it with hot water, there remains a yellowish-brown residue which on recrystallization from nitro-benzene constitutes pure benzanthronylsulfide being analogous as regards its properties to that obtained according to Example 1.

Other suitable methods for preparing compounds of the aforesaid character may also be employed. For example benzanthronyl-sulfide may be prepared by acting on benzanthronyl-mercaptan or benzanthronyl-disulfide with bodies capable of taking up or withdrawing sulfur, for example copper, phenol and the like, or by simply heating benzanthronyl-mercaptan to an elevated temperature, for example to 300 °C.

(5) Equal weights of Bz-1-Bz-1'-benzanthronyl-disulfide copper bronze and naphthalene are heated to 220–240° C. for 6 hours. The product is freed from naphthalene and copper and crystallized from nitrobenzene.

The benzanthronyl-disulfide of the formula

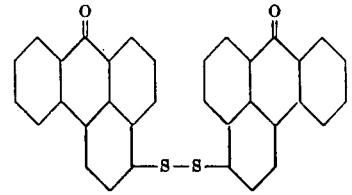

may be prepared by heating nitro-benzanthrone with sulfur for example by boiling the two agents together with trichlorobenzene. The reaction mass is cooled to 30 or 40° C. and filtrated to separate it from unaltered sulfur, whereupon the trichlorobenzene is driven off with steam and the residue is boiled with sodium sulfide solution to extract benzanthronyl-mercaptan which may then be precipitated in the form of a sodium salt by an addition of common salt. The mercaptan may be oxidized to the disulfide by adding to the sodium salt, dissolved in water, suitable oxidizing agents, for example hypochlorite solution. The residue remaining after the treatment with sodium sulfide solution constitutes benzanthronyl-sulfide, which may be crystallized from nitrobenzene. Another way consists in heating nitrobenzanthrone either with benzanthronyl-mercaptan preferably in the presence of diluents and in the presence of substances capable of absorbing mixtures of oxides of nitrogen, for example sodium carbonate or bisulfite.

(6) 10 parts of benzanthrone are heated to boiling with 20 parts of sulfur chloride in 100 parts of chlorobenzene while adding 0,5 parts of sublimed ferric chloride until the evolution of hydrochloride acid, which is at first rather lively, is complete. After cooling the mass is filtered off and washed with chlorobenzene and alcohol. The resulting dark brown crude product is then treated with a concentrated solution of sodium sulfide while hot until all the mercaptan is dissolved. There remains besides some Bz-1-Bz-1'-benzanthronyl-sulfide an insoluble residue, being a body of sulfide-character, containing three atoms of sulfur on one molecule of benzanthrone. This body is sparingly soluble in hot nitrobenzene so that it is possible to isolate it from the benzanthronyl-sulfide. Its solution in concentrated sulfuric acid shows a green color. By adding common salt there is salted out from the sulfur-alkaline filtrate only a small quantity of sodium salt namely that of the Bz-1-benzanthronyl-mercaptan; the greater part of the filtrate remains in solution of a bluish-violet color and must be oxidized and separated as disulfide. The latter forms a yellow powder which dissolves in concentrated sulfuric acid with a green coloration and which by analysis and by the properties of its derivatives could be discerned as a dimercapto-benzanthronyl-sulfide. It corresponds probably to the following formula:

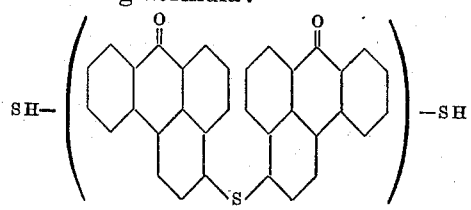

This body may also be obtained by causing sulfur chloride to act upon Bz-1-Bz-1'-benzanthronyl-sulfide. The dimethylthio-ether, produced from the alkaline solution of mercaptide by subjecting the latter to reaction with dimethylsulfate, is an orange-colored powder which melts at 165–177° C. and dissolves in concentrated sulfuric acid to a greenish-blue solution.

(7) One part of Bz-2-methoxybenzanthrone to which a very little quantity of iodine has been added, is heated to 95–100° C. in 10 part of chlorobenzene, there are then gradually added 2 parts of sulfur chloride and the mixture is kept at a temperature of 95–100° C. until the reaction is complete. After removing the dissolving agent by means of water-vapour the brown residue is extracted by boiling it with a solution of sodium sulfide while adding a small quantity of alcohol. The resulting sodium mercaptide of the formula

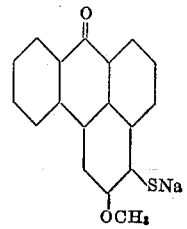

may be salted out from the bluish-violet filtrate. The disulfide obtained therefrom by oxidation is an orange-red powder, which dissolves in concentrated sulfuric acid to a dark red solution. There remains, besides some quantity of unaltered parent material, a residue, which is insoluble in sodium sulfide and constitutes chlorinated products.

In the following claims the term "aryl group" is intended to include residues of the benzene series as well as of the napthalene, anthracene, benzanthrone, etc., series. The term "sulfur halide" is intended to include only such compounds as do not contain oxygen.

We claim:
1. Process of preparing derivatives of the benzanthrone series containing sulfur, which consists in causing a sulfur halide to act upon a benzanthrone.
2. Process of preparing derivatives of the benzanthrone series containing sulfur, which consists in causing a sulfur chloride to act upon a benzanthrone.
3. Process of preparing derivatives of the benzanthrone series containing sulfur, which consists in causing a sulfur halide to act upon a benzanthrone in presence of an indifferent solvent and a catalyst.
4. As new products, dirivatives of the benzanthrone series containing sulfur, being substantially identical with the compounds obtainable by subjecting a benzanthrone to the action of a sulfur halide.
5. As new products the compounds of the general formula:

X—S—Y wherein X stands for a substituted or unsubstituted benzanthronyl residue and Y stands for a substituted or unsubstituted alkyl-, aryl-, aralkyl-, or aliphatic acidyl group or a hydrogen atom.
6. As new products the compounds of the general formula:

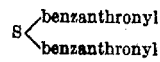

wherein the benzanthronyl residue may be substituted.

7. As a new product the benzanthronyl-sulfide of the probable formula:
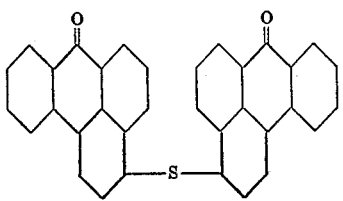
crystallizing from nitrobenzene in dark yellow laminæ melting at 347° C.
In testimony whereof, we affix our signatures.
Dr. OTTO BRAUNSDORF.
EDUARD HOLZAPFEL.
PAUL NAWIASKY.